US006957343B2

United States Patent
Ripley et al.

(10) Patent No.: US 6,957,343 B2
(45) Date of Patent: Oct. 18, 2005

(54) VALIDATING KEYING MATERIAL BY USING A VALIDATION AREA OF READ-ONLY MEDIA TO PREVENT PLAYBACK OF UNAUTHORIZED COPIES OF CONTENT STORED ON THE MEDIA

(75) Inventors: Michael S. Ripley, Hillsboro, OR (US); C. Brendan S. Traw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 844 days.

(21) Appl. No.: 09/822,542

(22) Filed: Mar. 30, 2001

(65) Prior Publication Data

US 2002/0141576 A1 Oct. 3, 2002

(51) Int. Cl.[7] .............................. G06F 12/14; H04L 9/00
(52) U.S. Cl. ....................................... 713/193; 380/201
(58) Field of Search .......................... 713/193; 380/200, 380/201, 202; 705/57

(56) References Cited

U.S. PATENT DOCUMENTS

| 5,418,852 A | 5/1995 | Itami et al. ................... 705/57 |
| 5,883,958 A | 3/1999 | Ishiguro et al. ............... 705/57 |
| 2003/0145181 A1 | 7/2003 | Bae ............................. 711/163 |

FOREIGN PATENT DOCUMENTS

| EP | 0984346 A1 | 3/2000 |
| WO | PCT/WO01/95327 A2 | 12/2001 |

OTHER PUBLICATIONS

Ripley, et al. "Content Protection in the Digital Home", Intel Technology Journal, vol. 6, pp. 49–56.

"Content Protection for Recordable Media Specification", Introduction and Common Cryptographic Elements, Intel Corporation International Business Machines Corporation, Matsushita Electric Industrial Co., Ltd. Toshiba Corporation, Revision 0.94, Oct. 18, 2000.

"Content Protection System Architecture", A Comprehensive Framework for Content Protection, Intel Corporation International Business Machines Corporation, Matsushita Electric Industrial Co., Ltd Toshiba Corporation, Revision 0.81, Feb. 17, 2000.

"C2 Block Cipher Specification", Intel Corporation International Business Machines Corporation, Matsushita Electric Industrial Co., Ltd Toshiba Corporation, Revision 0.9, Jan. 11, 2000.

Intel Corporation et al. "Content Protection For Recordable Media Specification: DVD Book, Revision 0.94". 4C Entity, Oct. 18, 2000, XP002167964.

Intel Corporation et al: "Content Protection For Prerecorded Media Specification, DVD Book, Revision 0.93" 4C Entity, Jan. 31, 2001, pp. I–2.9 XP002202232.

PCT/US 02/08971, filing date: Mar. 22, 2002, 8 pages.

*Primary Examiner*—Matthew Smithers
(74) *Attorney, Agent, or Firm*—Libby H. Hope

(57) ABSTRACT

In one aspect of the invention is a method for preventing unauthorized copies of a medium, such as a DVD, from being played by a compliant device by using the validation area (VA) region of a medium to validate keying material. A compliant device is a device that will validate keying material. In one embodiment of the invention, a compliant device validates keying material by using the value in the VA region of the medium. In alternative embodiments, a compliant device will validate keying material by checking correspondence between keying material written to a non-VA region of a medium and validation data written to a VA region of a medium. In the alternative embodiments, if the keying material does not correspond to the validation data, then a compliant device will prevent the contents of the medium from being played.

60 Claims, 5 Drawing Sheets

US 6,957,343 B2

VALIDATING KEYING MATERIAL BY USING A VALIDATION AREA OF READ-ONLY MEDIA TO PREVENT PLAYBACK OF UNAUTHORIZED COPIES OF CONTENT STORED ON THE MEDIA

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

This invention relates to static and dynamic information storage and retrieval. More particularly, this invention relates to methods, apparatus and systems for the protection of stored information from unauthorized copying.

BACKGROUND OF THE INVENTION

Information or content may be stored on a wide variety of media. As the speed and convenience of accessing and copying stored information have increased, the threat of unauthorized copying of the information has increased correspondingly. Various schemes have been employed to protect content stored on read-only media from unauthorized access by storing various types of data in different regions of the medium.

One such scheme can be illustrated in a medium such as a DVD-ROM (Digital Versatile Disc-Read Only Media), as illustrated in FIG. 1A. The medium 100 comprises a Data Area 102 and a Lead-In Area 104 (hereinafter referred to as a Non-Data Area 104). As further illustrated in FIG. 1B, the Data Area 102 comprises encrypted content 112 (or scrambled content in the case of DVD-Video content protected by the Content Scramble System (CSS)).

On a DVD-ROM disc that contains DVD-Audio content protected by CPPM, for example, the Control Data Area 110 (CDA 110) stores Keying Material 114 called an Album Identifier (and/or possibly Secure Disk Key Data in the case of DVD-Video content protected by the Content Scramble System). The Album Identifier is an 8-byte (64-bit) value that is randomly and individually assigned to each album to be protected. The cryptographic key needed to decrypt Encrypted Content 112 that is stored on the Data Area 102 of the medium is dependent on the Album Identifier value. Thus, if the Album Identifier is incorrectly copied to recordable media, for example, the incorrect Album I.D. will cause a player to form an incorrect cryptographic key, thus preventing the recordable medium from being played in a compliant manner.

For such content protection to be effective, it is ideal that recordable media be designed to prevent the sector that contains the Keying Material 114 (e.g., Album Identifier that is stored in Control Data Area 110, Sector #2 or CDA 110 Sector #2 in the case of a DVD-ROM) from being written such that the Keying Material 114 cannot be copied. However, some forms of recordable media, such as DVD-R (Digital Video Disc-Recordable) and DVD-RW (Digital Video Disc-ReWriteable), which have sectors/layout similar to the DVD-ROM layout depicted in FIGS. 1A and 1B, may contain writeable sector addresses which allow one to record Keying Material 114 in the Data Area 102 and assign it the address of the sector containing the Keying Material 114, such that a player may not be able to distinguish it from legitimate Keying Material 114. Of course, it is also possible that other media (such as non-compliant DVDRs and DVD-RWs) may allow the sector that contains the Keying Material 114 to be directly written.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1A:
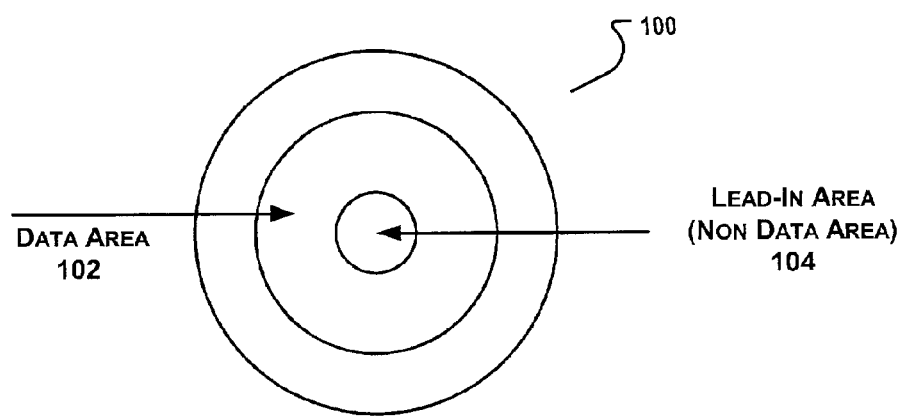
FIG. 1A depicts a first view of a medium, such as a DVD (Digital Versatile Disc).
Figure 1B:
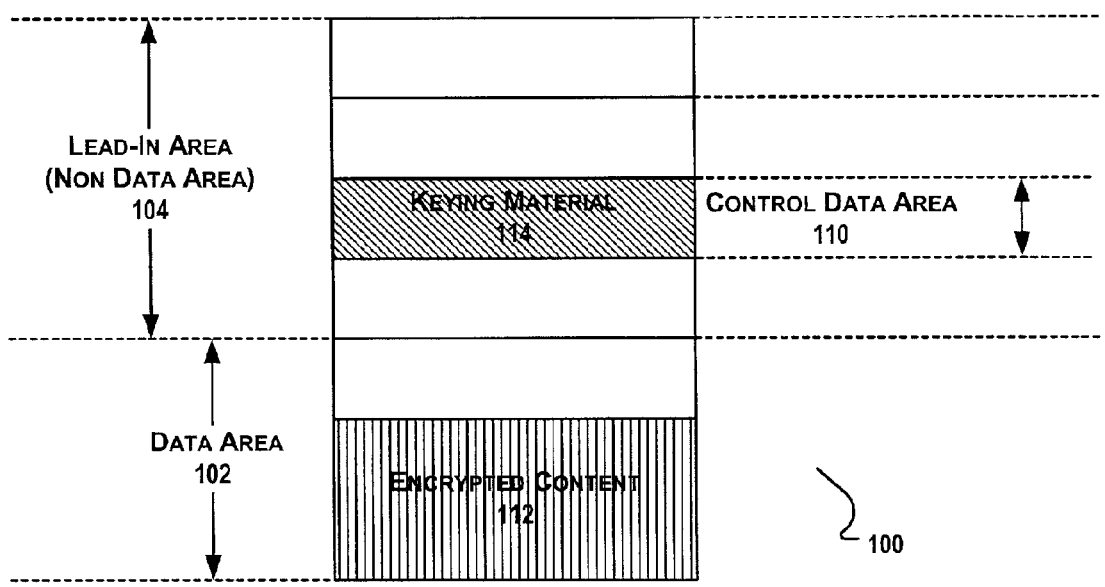
FIG. 1B depicts an alternative view of the medium shown in FIG. 1A.

In one aspect of the invention, a method for validating Keying Material stored on read-only media, such as a DVD-ROM, by using a Validation Area (VA) region of a medium to validate the authenticity of the Keying Material to prevent the playback of unauthorized copies of content prerecorded on read-only media, is disclosed.

Keying Material as well as Validation Data used for validating the authenticity of the Keying Material are stored on read-only media. In one embodiment, a Validated Medium (i.e., a medium that comprises and uses a Validation Area to validate Keying Material, to be discussed), comprises Keying Material that may be directly written to the Validation Area of the medium. In this embodiment, Validation Data comprises the Keying Material itself.

In one alternative embodiment, a Validated Medium comprises Keying Material that may be written to a non-Validation Area (non-VA region) of the medium, and Validation Data related to that Keying Material is created and written to the Validation Area (VA region) of the medium.

In one variation of this alternative embodiment, Keying Material is written to a non-VA of the medium, and Validation Data comprises a copy of the Keying Material that is written to the VA region of the medium. In another variation, Keying Material is written to a non-VA of the medium, and Validation Data comprises a function of the Keying Material that is written to the VA region of the medium.

In embodiments of the invention, a device for playing Validated Media is called a compliant device (hereinafter referred to as "compliant device" or simply "device", where a device that is non-compliant will be referred to as a "non-compliant device").

In one embodiment, a Validated Medium comprises Keying Material directly written to the VA region of the medium, where the Validation Data comprises the Keying Material, and a compliant device validates the Keying Material without finding correspondence between the Keying Material and the Validation Data by virtue of the Keying Material being in the VA region of the medium. Newer media may comprise Keying Material that is directly written to the VA region of the media, and would rely on compliant devices for playability.

In an alternative embodiment, a Validated Medium comprises Keying Material on a non-VA region of the medium, and Validation Data related to the Keying Material on the VA region of the medium, and a compliant device may validate the Keying Material without finding correspondence, or, alternatively, by finding correspondence between the Keying Material and the Validation Data as a prerequisite to validation. To preserve compatibility with non-compliant devices (which do not look for Validation Data in the VA region of media), newer media may comprise Keying Material 114 that is written to a non-VA region of a medium (where a non-compliant device would expect to find Keying Material 114, and where a compliant device would look for Keying Material 114 to validate), and write Validation Data to a VA region of a medium (where a compliant device would expect to find data for validating the Keying Material 114 that is in the non-VA region).

In summary, a compliant device may validate the authenticity of Keying Material in a Validated Medium without checking correspondence where the Keying Material is written to the VA region of the medium, such that the Validation Data comprises the Keying Material itself. It is also contemplated that a compliant device may validate the authenticity of Keying Material in a Validated Medium without checking correspondence where Validation Data is written to the VA region of the medium, and Keying Material is written to the non-VA region of the medium.

Where no correspondence is checked, a compliant device relies on the properties of a VA region to establish that the Validation Data contained therein is correct, whether or not it corresponds to Keying Material 114 that may be written to the non-VA region of the medium. The Validation Data in the VA region may be used directly in protection schemes where the Validation Data comprises the Keying Material 114 itself (i.e., newer media relying on compliant devices); where the Validation Data comprises a copy of the Keying Material 114; or where a function exists for translating the Validation Data to the Keying Material 114, for example. At worst, if the Validation Data in the VA is incorrect, the resulting Keying Material 114 will form an incorrect cryptographic key, thereby preventing the content from being played in a compliant manner.

A compliant device may alternatively validate the authenticity of Keying Material 114 in a Validated Medium by finding correspondence between the Keying Material 114 and the Validation Data where Validation Data is written to the VA region of the medium, and Keying Material 114 is written to the non-VA region of the medium.

Where correspondence is checked and validated, a compliant device can be confident that there has been no tampering of the Keying Material 114 in the non-VA region of the medium, since it corresponds properly to the Validation data in the VA. If the Keying Material 114 and the Validation Data do not correspond in the latter case, then the compliant device assumes that the medium has been tampered with, and the device will not validate Keying Material 114 so as to prevent playback of the medium.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

TERMS

As used throughout this description, the following terms shall be accorded their respective meanings:

VA (Validation Area)

A VA is a portion of a medium that has physical properties that make it difficult to mimic using ordinary consumer recording equipment/media. A VA requires special manufacturing equipment to write, making its contents difficult to copy. Furthermore, since the VA is read using a physically different process from that used to read the other areas of a medium, a device can physically distinguish contents written to a VA from contents that may have been written by an ordinary recorder on ordinary recordable media. One example of a VA is the Burst Cutting Area of a DVD-ROM.

It should be understood by one of ordinary skill in the art that the term "VA" or "VA region" is to be construed as an area having the general properties described herein, and that the term "VA" or "VA region" shall not preclude other areas having the properties of a VA described herein from being construed as an equivalent of a VA.

Validated Medium

A Validated Medium is a medium on which the VA is used to validate Keying Material 114. A Validated Medium comprises Validation Data in the VA region of the medium. In embodiments of the invention, a medium is illegitimate, or unauthorized, if Keying Material 114 in a Validated Medium cannot be validated, as will be discussed further below.

A non-Validated Medium is merely a medium that does not comprise Validation Data in the VA region, but does not imply that the medium is an illegitimate, or unauthorized medium. In embodiments of the invention, a non-Validated Medium is played by a compliant device (as well as a non-compliant device) so as to preserve compatibility between compliant devices and legitimate, older media. These embodiments encourage consumers to buy newer devices, which will still play older media, but which will also prevent illegitimate discs from being played. Of course, it is also contemplated that compliant devices may prevent non-Validated Media from being played.

Keying Material

Keying Material 114 comprises value(s) on which access to protected content depends. In content protected by CSS (to be discussed), Keying Material 114 may comprise Secure Disc Key Data; and in content protected by CPPM (to be discussed), Keying Material 114 may comprise an Album Identifier. Typically, the value is used as a key, or is used to form a cryptographic key, for decrypting encrypted content 112. While the value may be unique for every medium, it is typically unique for some set of media.

Validation

Keying Material 114 is validated when it is used to decrypt encrypted content 112 (or form the cryptographic key needed to decrypt content), thereby allowing playback of the read-only content.

Where correspondence is checked prior to validation, Keying Material 114 from the non-VA region of the medium is used if correspondence is found.

Where no correspondence is checked for validation, Keying Material 114 used to decrypt the encrypted content is derived from Validation Data. Where the Validation Data comprises the Keying Material 114 (i.e., they are one and the same), or where the Validation Data is a copy of the Keying Material 114 in the non-VA region, the Keying Material 114 is derived from the Validation Data by using the Validation Data itself.

In other cases, Keying Material 114 may be derived from the Validation Data by converting the Validation Data to the original Keying Material. For example, in some embodiments (such as in content protection schemes like CSS, to be discussed), Validation Data is a function of Keying Material 114, such that to use the original Keying Material 114 to decrypt the content, the same cryptographic function is used on the validation Data to form the original Keying Material 114.

Device

A device is any mechanism for playing back content on a read-only medium. For DVDs, such a mechanism comprises a DVD playback device, which may be a DVD player, or a DVD drive, for example.

Compliant Device

A compliant device is a device that will play a Validated Medium.
Introduction

Figure 2:
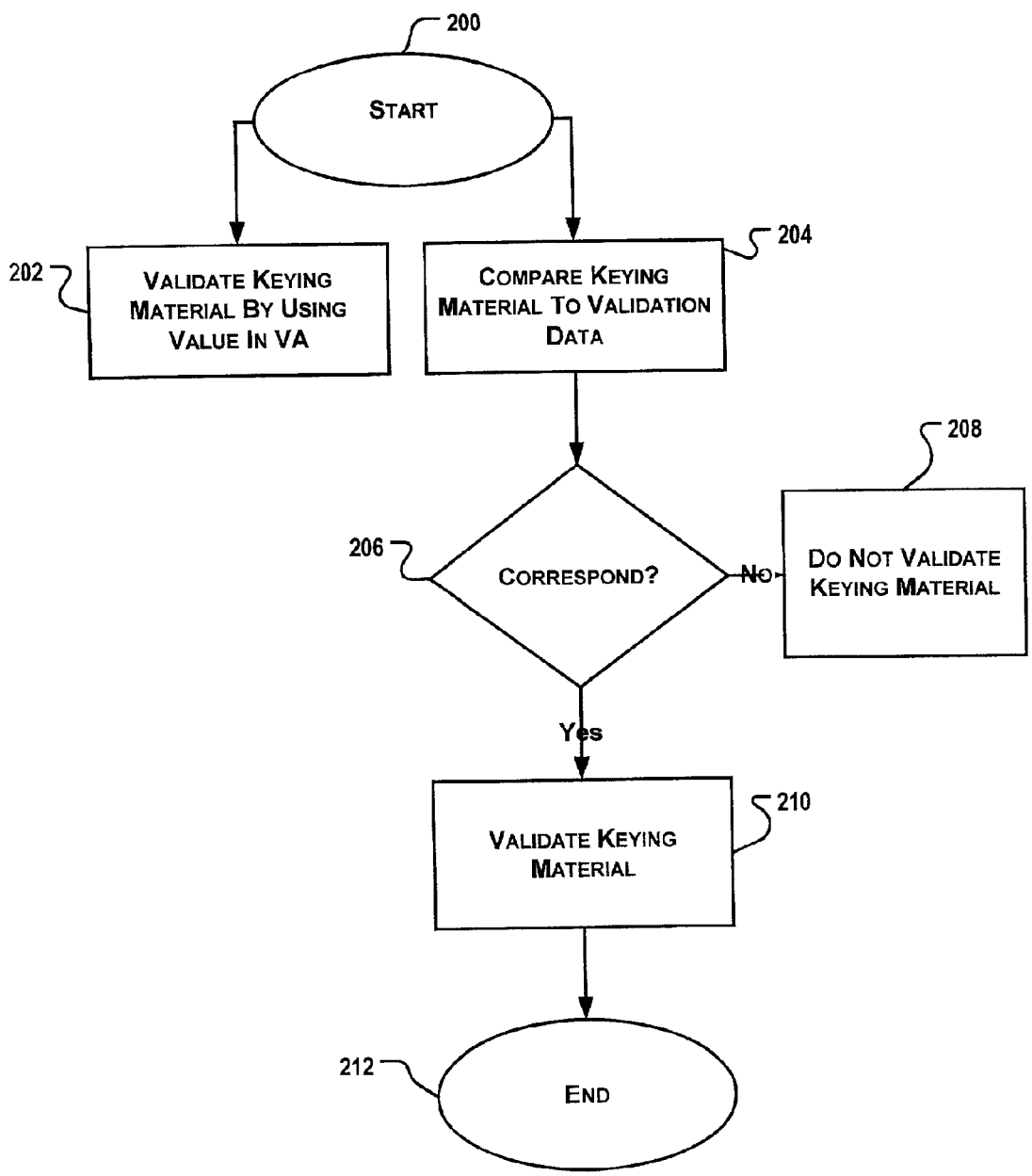
FIG. 2 is a flowchart illustrating a method in general embodiments of the invention.

Generally, as shown in the flowchart of FIG. 2, which begins at block 200, a compliant device playing a Validated Medium validates the Keying Material 114 in one of two ways. The compliant device may validate the Keying Material 114 by using Validation Data in the VA, shown in block 202, where the Validation Data may comprise the Keying Material 114 in the VA region; a copy of the Keying Material 114 in the non-VA region; or a function of Keying Material 114 that is written to the non-VA region (in which case the Validation Data is first subject to a function prior to being used to decrypt content, as discussed above). In the rare, or unlikely case that the Validation Data comprises some other value which will produce an incorrect cryptographic key, or does not comprise a value at all, a compliant device may still "validate" the Keying Material and use the value in the VA region, but an incorrect/invalid value in the VA region will prevent the content from being played.

Alternatively, a compliant device may compare Keying Material 114 written to a non-VA region of the medium to Validation Data written to a VA region of the medium, as shown in block 204. In block 206, it is determined if the Keying Material 114 and the Validation Data correspond. If they do not correspond, then the device does not validate the Keying Material 114 in block 208, thereby preventing the Keying Material 114 from being used to decrypt the encrypted content 112, and thereby preventing playback of the content. If the Keying Material 114 and the Validation Data 402 correspond, then in block 210, the device validates the Keying Material 114, allowing it to be used for decrypting the encrypted data 112. The method ends at block 212.

Given embodiments of this invention, the following outlines the different scenarios that may exist for playing media:

1. Validated Medium is played on a compliant device: compliant devices recognize the VA region of a medium, and will therefore look for Validation Data in the VA. Keying Material 114 may be automatically validated, as shown in block 202 of FIG. 2 in newer media that rely solely on compliant devices, or where a particular implementation trusts the VA properties of the medium. Other implementations may choose to find correspondence between the Validation in the VA and Keying Material 114 in the non-VA prior to validating the Keying Material 114, as shown in block 206 of FIG. 2.

2. Validated Medium is played on a non-compliant device: non-compliant (i.e. older) devices may not recognize the VA region of a medium, or may simply not be designed to look for Validation Data in the VA. Such devices will use the Keying Material 114 in the non-VA region of the medium to decrypt the content in accordance with previous methods for decrypting.

3. Non-Validated Medium is played on a compliant device: a compliant device will look for, but not find a BCA containing Validation Data. The device will, in this case, use the Keying Material 114 in the non-VA region to decrypt the content in accordance with previous methods for decrypting. (As discussed above, the device may alternatively prevent playback of the content on the medium.)

4. Non-Validated Medium is played on a non-compliant device: a non-compliant device will use the Keying Material 114 in the non-VA region to decrypt the content in accordance with previous methods for decrypting.

Figure 3:
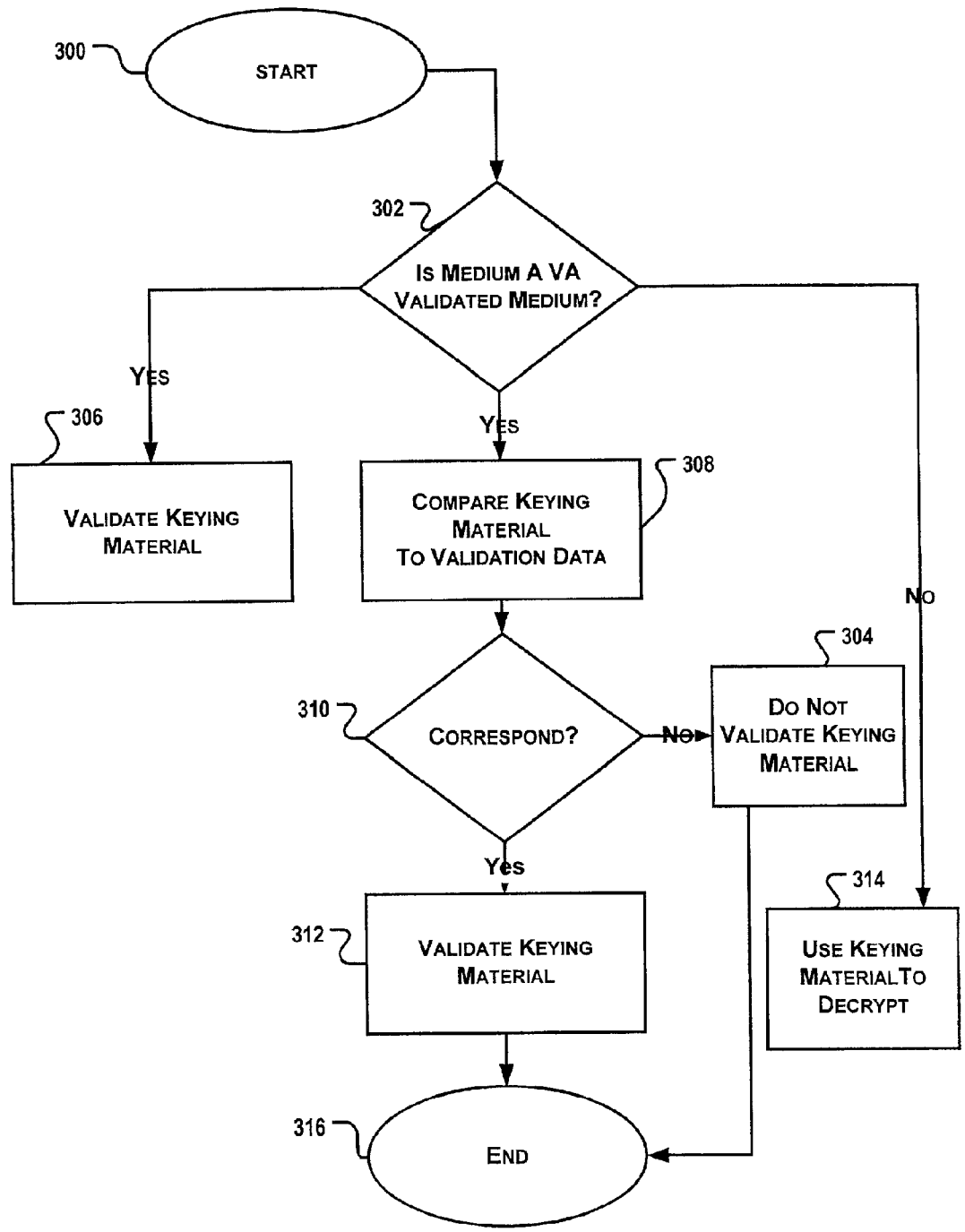
FIG. 3 is a flowchart illustrating an alternative method in embodiments of the invention.

In scenarios 2 and 4, a non-compliant device will not prevent the playback of unauthorized copies of media. In scenarios 2 and 3, prevention of unauthorized copies cannot be implemented with a Validated Medium or with a compliant device, but interoperability between new devices and old media (scenario 3), as well as old devices and new media (scenario 2), is maintained. To preserve compatibility with old devices and old media, the method of FIG. 2 can be modified as shown in FIG. 3, beginning at block 300.

At block 302, a determination is made as to whether the medium being read is a Validated Medium (the determination to be discussed in further detail). If the medium is not a Validated Medium, then at block 314 the compliant device does not look for Validation Data, but instead simply uses the Keying Material 114 in the non-BCA region of the medium to decrypt the content in accordance with previous methods for decrypting. This determination preserves interoperability between compliant devices and non-BCA validated media, such that if the medium being read is not a Validated Medium, then the compliant device will not necessarily prevent the non-Validated Medium from being played.

At blocks 306 and 308, the medium is determined to be a Validated Medium. The compliant device may validate the Keying Material 114 by using the Validation Data in the VA (in certain cases, as discussed above), as shown in block 306. Since the VA has the special properties that make its contents difficult to copy, the compliant device has a certain degree of confidence that the data in the VA has not been tampered with.

The compliant device may alternatively validate the Keying Material 114 by comparing the Keying Material 114 in the non-VA region of the medium to the Validation Data in the VA of the medium, shown in block 308. Continuing to store Keying Material 114 in the non-VA region of the medium can be a means of preserving interoperability between Validated Media and non-compliant devices such that if a Validated Medium is read by a non-compliant device, which expects to find the Keying Material 114 in the non-VA of a given medium, the non-compliant device will not error out. Thus, a non-compliant device will look for Keying Material 114 in the non-VA of the medium and use that value to decrypt the content. A non-compliant device, however, has no mechanism for validating the authenticity of the Keying Material 114, even if the medium is a Validated Medium.

A compliant device, on the other hand, can validate the authenticity of the Keying Material 114 written to a Validated Medium. At block 310, a determination is made as to whether the Keying Material 114 corresponds to the Validation Data. If there is no correspondence (correspondence to be discussed), then at block 304 the compliant device does not validate the Keying Material 114, thereby preventing playback of the content. At block 312, if there is correspondence, then the compliant device validates the Keying Material 114. The method ends at block 316.

By embodiments of this invention, BCA validated media can prevent hackers from copying Keying Material 114 (and/or its associated Validation Data) that is stored on a DVD-ROM onto a DVD-R, for example, thereby making an unauthorized copy of the DVD-ROM on the DVD-R unplayable. On non-Validated Media, such as a non-Validated DVD, hackers can do this, for example, by:

Writing Keying Material 114 to the Data Area 102 of the DVD-R (specifically, the User Data Area of the DVD-R), but assigning it an address within the CDA 110 of the DVD-ROM such that a device cannot distinguish it from legitimate Keying Material 114 found on the original DVD-ROM.

Directly writing valid Keying Material 114 from the DVD-ROM onto the CDA 110 of a non-compliant DVD-R disc.

Figure 4:
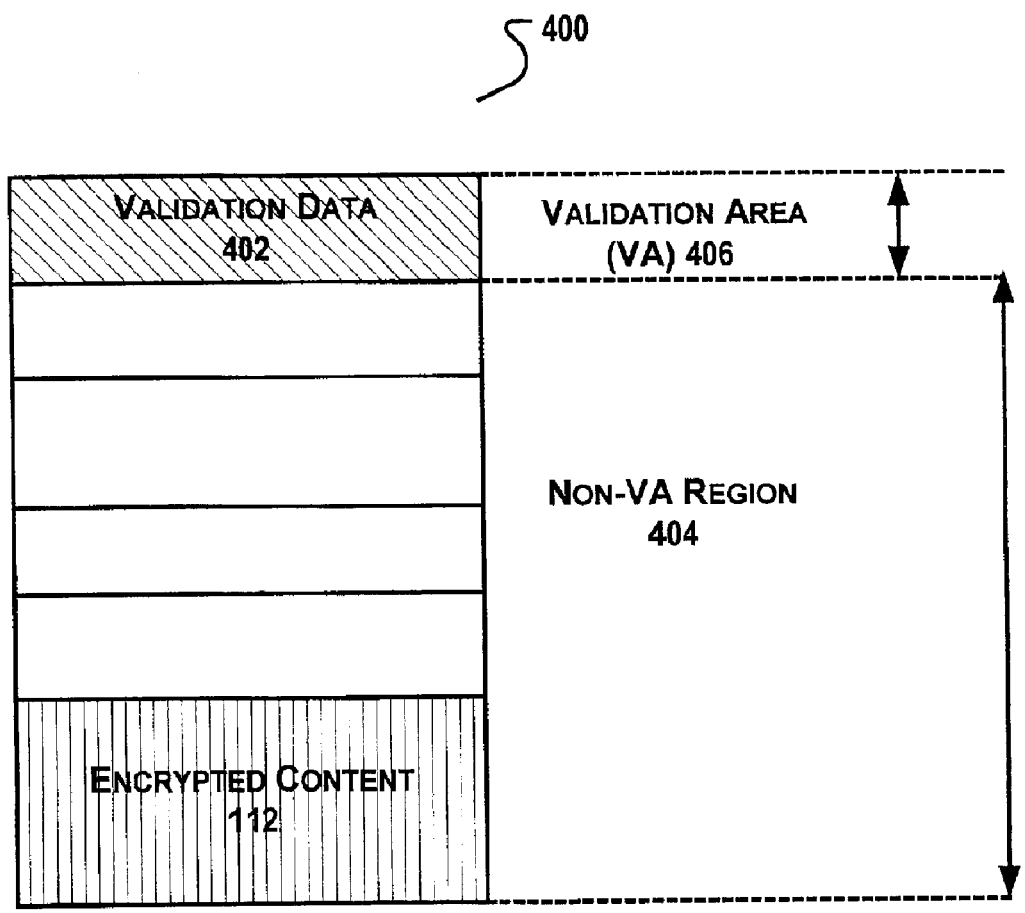
FIG. 4 depicts a layout of a BCA validated medium in accordance with embodiments of the invention.

As illustrated in FIG. 4, therefore, a Validated Medium 400 comprises a Validation Area 406 (VA) region and a non-VA region 404, where the VA region comprises Validation Data 402, and the non-VA region 404 comprises Encrypted Content 112. In some embodiments, the non-VA region 404 may additionally comprise Keying Material 114.

Exemplary Embodiments

Examples of media comprising a Validation Area 406 include DVD-ROMs (DVD-Read Only Memories). Several exemplary embodiments are described herein with reference to DVD media. Specifically, concepts related to this invention are described in relation to the following exemplary embodiments:

DVD Content Protected By CPPM

DVD Content Protected By CSS

DVD Content Protected By CPPM/CSS

While these particular embodiments are described, it should be understood by one of ordinary skill in the art that the invention is not intended to be limited to these particular embodiments, and that general concepts of the invention are applicable to various embodiments not discussed herein.

The current state of these embodiments is discussed in this section ("Exemplary Embodiments"). General concepts of the invention as they relate to these exemplary embodiments are described in subsequent sections. Where appropriate, or where helpful to understanding the invention, the general concepts of the invention are illustrated with reference to these exemplary embodiments.

DVD Content Protected By CPPM

The Content Protection For Prerecorded Media (CPPM) specification defines a robust and renewable method for protecting content distributed on prerecorded (read-only) media types. In one exemplary embodiment, a specification is defined for using CPPM technology to protect DVD-Audio content distributed on read-only DVD (DVD-ROM) discs.

Generally, each CPPM compliant DVD-Audio playback device (such as a hardware DVD player, or a software player used in conjunction with a computer equipped with a DVD drive) is given a set of 16 Device Keys denoted $K_{d\_0}$, $K_{d\_1}, \ldots, K_{d\_15}$. These keys are provided by the 4C Entity, LLC, and are for use in processing the MKB (Media Key Block) to calculate the Media Key ($K_m$). Key sets may either be unique per device, or used commonly by multiple devices.

Each side of a disc with CPPM protected DVD-Audio content contains:

Keying Material 114 called an Album Identifier ($ID_{album}$) prerecorded in the Lead-In Area 104 (specifically, the Non-User Data Area).

A Media Key Block (MKB) prerecorded as a specific file in the Data Area 102.

Encrypted Content 112 prerecorded as specific files in the Data Area 102.

For purposes of this invention, the Album Identifier is described in further detail below; however, since the MKB and Encrypted Content 112 concepts are not pertinent to embodiments of this invention other than as described above, they are not discussed any further. For a detailed explanation of how an Album Identifier is used in conjunction with a Media Key Block to prevent unauthorized copying of content protected by CPPM, one can refer to the document entitled "CONTENT PROTECTION FOR PRE-RECORDED MEDIA SPECIFICATION, DVD BOOK" published by the 4C Entity, LLC, Revision 0.93, dated Jan. 31, 2001.

Each side of a disc with CPPM Protected DVD-Audio content contains a 64-bit Album Identifier ($ID_{album}$), which is placed in the Non-Data Area 104 by the disc manufacturer. Specifically, the Album Identifier is placed in bytes 80 through 87 of Control Data Area 110 Sector #2. The most significant 8 bits of the Album Identifier (stored in byte 80) are currently defined to have a value of zero. For forward compatibility, a non-zero value in these 8 bits is not considered an error. For the remaining 56 bits, the content provider individually assigns a secret, unpredictable (e.g., random) value to each DVD-audio album to be protected using CPPM. At the content provider's option, all pressings of a given album may contain the same $ID_{album}$ value, or different values may be assigned for different pressings.

The role of the Album Identifier is not that of individual media identification. Rather, it serves as an album-specific value that is integrated into CPPM cryptographic key management, and placed in a location that is not writeable on compliant DVD recordable-rewriteable media. In a PC (personal computer) system, the Album Identifier is accessed using the DVD drive authentication protocol. For consistency with other non-CPPM uses of that protocol, the confidentiality of the data in Control Data Area 110 Sector #2, including the Album Identifier value, should be maintained.

DVD Content Protected By CSS

Content Scramble System (CSS) is a data scrambling and authentication scheme intended to prevent copying DVD-Video files directly from the disc.

The CSS scrambling algorithm exchanges keys with the drive unit to generate an encryption key that is then used to obfuscate the exchange of disc keys and title keys that are needed to descramble data from the disc. DVD players have CSS circuitry that decrypts the data before it's decoded and displayed. On the computer side, DVD decoder hardware and software must include a CSS decryption module. All DVD drives have extra firmware to exchange authentication and decryption keys with the CSS module in the computer.

DVD Content Protected By CPPM/CSS

On combination discs that include both CPPM and CSS content, the CDA 110 contains not only the CPPM Album Identifier, but also the Secure Disc Key Data, which must be kept secret.

Determining if a Medium is a BCA Validated Medium

As used herein, media which uses the Validation Area 406 to validate Keying Material 114 is referred to as Validated Media 400. There are various methods for determining if a medium is a Validated Medium 400. For example, in one embodiment of the invention, a medium is a prerecorded DVD with CPPM protected content. In DVD's, the VA region 406 of the media is referred to as the Burst Cutting Area (BCA), and where the DVD uses the CPPM protection scheme, Keying Material 114 comprises an Album Identifier. The Album Identifier is written to a non-BCA region, specifically the Control Data Area 110 of the Lead-in Area 104. As mentioned previously, the Album Identifier is an 8-byte (64-bit) value. Under the current state of the art, the most significant 8 bits are set to 0.

To implement embodiments of the invention using DVD protected by CPPM, the most significant 8 bits are used to indicate that a medium is a Validated Medium 400 by setting any one or more of those bits to 1. Thus, when a device determines whether a CPPM protected medium is a Validated Medium 400, it examines the Album Identifier to determine if its most significant bit, for example, is set to 1. If it is, then the device is triggered to look for Validation Data 402 in the Validation Area 406 (specifically, the BCA) of the medium 400. Otherwise, the medium is not a Validated Medium 400, and the device will simply use the Keying Material 114 in the non-VA region of the medium to decrypt the content in accordance with previous methods.

In other embodiments, such as where Secure Disc Key Data is written to the non-VA region of a medium, other methods may be used to determine if the medium is a Validated Medium 400. Generally, some sort of trigger is used, which would typically involve setting some data item that is currently reserved or unused to a value other than its currently defined value. In embodiments of the invention, the data item that is used as a trigger is integrated with the Keying Material 114, such that a compliant device can also determine whether the trigger value has been tampered with when validating the Keying Material 114.

For example, in content protected by CPPM, since the cryptographic key for decrypting content is dependent on the Album Identifier, any attempt to tamper with the Album Identifier will prevent it from producing the correct cryptographic key, thereby preventing the content from being played. Thus, if a hacker tries to thwart the scheme by flipping the most significant bit from 1 to 0 (in reference to the example above), the hacker will also change the Album Identifier. Although a compliant device will bypass validation, it will still use the Album Identifier in an attempt to decrypt the content, but since the Album Identifier has been tampered with, it will not produce the correct key for decrypting the content.

Keying Material

Keying Material 114 is a value or set of values that is written to a medium 100, 400 containing protected content, and upon which access to the content depends. For example, on DVD-Audio media protected by CPPM (Content Protection For Prerecorded Media), Keying Material 114 comprises an Album Identifier, which is an 8-byte (64-bit) value that is assigned individually and randomly to each album to be protected, and which is used in forming the cryptographic key needed to decrypt content on the medium, discussed supra. On DVD-Video media protected by CSS (Content Scramble System), Keying Material 114 comprises Secure Disc Key Data. On Media using a combination CSS/CPPM protection scheme, both an Album Identifier and Secure Disc Key Data are present.

Keying Material 114 that is used to decrypt content (either by using it directly, or by forming a cryptographic function to decrypt the content) can be derived from the Validation Data that is in the VA region, or it can be used directly from the non-VA region, as explained in the section entitled "Validation", supra.

Validation Data

Validation Data 402 is data that enables a playback device to verify that the Keying Material 114 read from the medium is authentic (i.e. is not an unauthorized copy written using widely available recording equipment and recordable media).

The nature and location of the Validation Data 402 varies depending upon the type of protection enabled for a given Validated Medium 400. In some cases, the Validation Data 402 may comprise the Keying Material 114 itself, and in other cases, the Validation Data 402 may comprise a copy of the Keying Material 114, or a cryptographic function of the Keying Material 114. Examples follow for each of the exemplary embodiments discussed above. In embodiments of the invention described herein, Validation Data 402 is written to the VA region 406 of a medium.

DVD Content Protected By CPPM

On Validated Media protected by CPPM where the Keying Material 114 comprises an Album Identifier, the Validation Data 402 comprises a copy of the Album Identifier.

DVD Content Protected By CSS or CPPM/CSS

On Validated Media where content is protected by CSS, and where content is protected by a combination scheme of CPPM/CSS, the Secure Disc Key Data are to be kept secret. Consequently, all values in CDA 110 sectors containing Secure Disc Key Data (possibly including sector #2 containing the Album Identifier) must be secret, due to the way that the sectors are scrambled during transfer from drive to host, for instance. However, storing a copy of the Album Identifier in the VA region 406 would make the value of the Secure Disc Key Data obvious (where a combination CPPM/CSS scheme is used), since the standard drive interface permits the BCA region 406 to be read in the clear.

Thus, in the case of content protected by CSS, where the Keying Material 114 comprises Secure Disc Key Data, the Validation Data 402 comprises a function on the Secure Disc Key Data. Where content is protected by a combination scheme, and the Keying Material 114 comprises both the Album Identifier and Secure Disc Key Data, Validation Data 402 comprises a function on the Album Identifier, as well as a function on the Secure Disc Key Data.

By using a one-way cryptographic function on a value to create the Validation Data 402, rather than using the given value itself, the value is prevented from being discovered by reading the VA region 406. At the same time, it permits devices to compare the Validation Data 402 in the BCA region 406 to the Keying Material 114 in the CDA 110, as described below in the section entitled "Determining Correspondence".

Other Content Protection Formats

New content protection formats and schemes for reading media can be designed by simply placing Keying Material 114 in the VA region of the medium, such that the Validation Data 402 comprises the Keying Material 114. Since the VA region has special properties that make mimicking that region very difficult, compliant devices can have a high degree of confidence that the data in the VA region has not been tampered with.

Alternately, new formats might be designed with Keying Material in the non-VA region of the medium, and Validation Data (possibly a copy of the Keying Material itself) in the BCA. This approach would allow providers of content on the new format to choose whether or not to include the Validation Data in the BCA (i.e. a trade-off between increased protection against unauthorized copies, versus the added manufacturing cost of including the BCA).

Determining Correspondence

Figure 5:
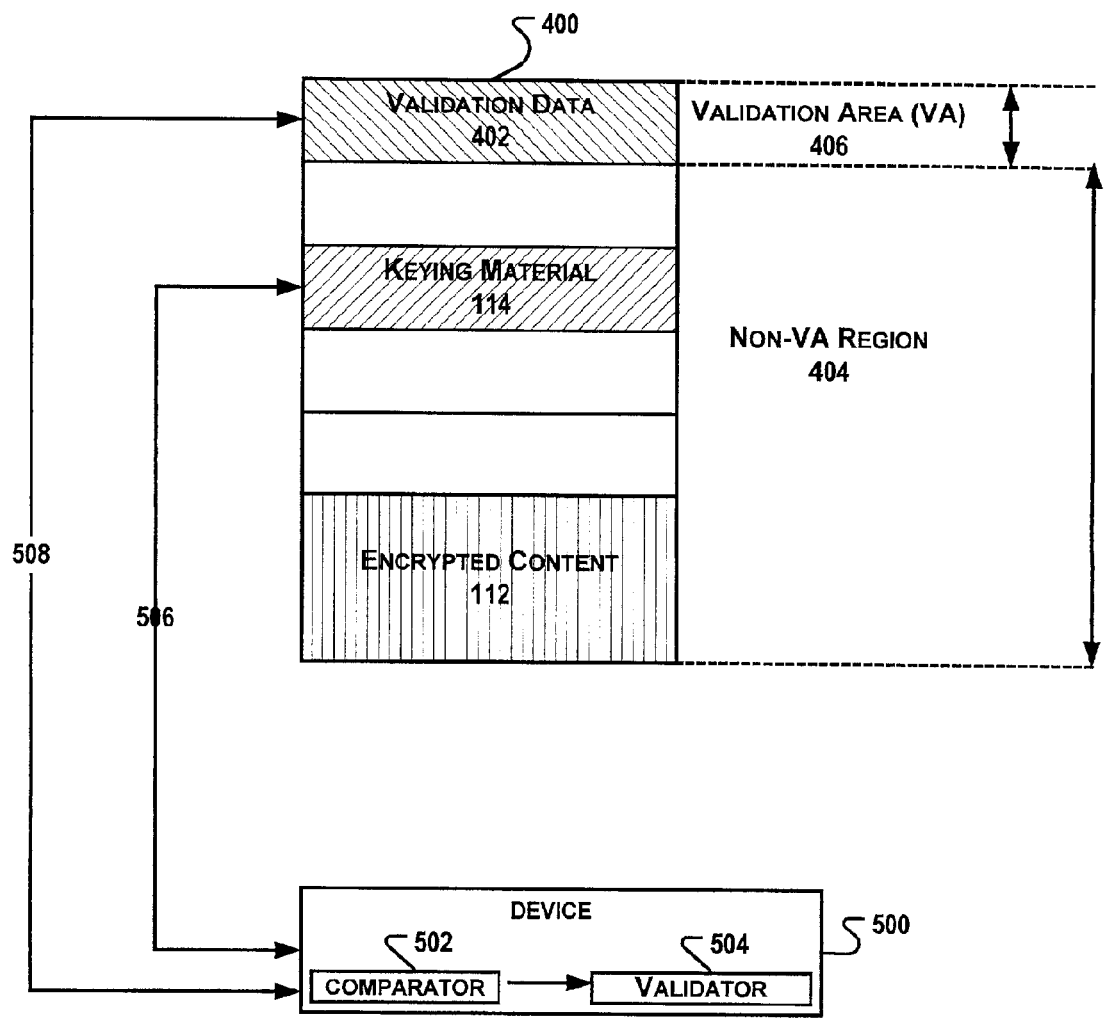
FIG. 5 is a conceptual diagram illustrating a system in accordance with embodiments of the invention.

As shown in FIG. 5, correspondence relates to whether a device 500 can validate Keying Material 114 by comparing the Keying Material 114 written to the non-VA region of a medium to Validation Data 402 in the VA region of the medium. In embodiments of the invention, correspondence is determined where Keying Material 114 is placed in non-VA region 404 of the medium, rather than just placing it in the more secure VA region 406, and where the scheme for a given compliant device does not automatically validate Validation Data 402 written to the VA region 406.

Assuming a compliant device, and a BCA validated medium 400 in one embodiment described above, the device 500 retrieves 506 the Keying Material 114 from the non-VA region 404 (e.g. the Control Data Area 110 of the Lead-in Area 104 on a DVD), and also retrieves the Validation Data 402 from the VA region 406.

A comparator 502 in the device 500 compares the Keying Material 114 to the Validation Data 402. If the values correspond, then a validator 504 in the device 500 validates the authenticity of the Keying Material 114, allowing the Keying Material 114 to be used for decrypting the content 112. Although the comparator 502 and the validator 504 are shown as separate entities in the device 500, it should be understood by one of ordinary skill in the art that such a depiction is for illustrative purposes only, and that the functionality may be combined into a single entity, and may alternatively be an entity distinct from the device itself.

Correspondence between Keying Material 114 and Validation Data 402 can be determined in a number of ways, depending upon the type of Keying Material 114 and Validation Data 402 used in a particular embodiment. Examples of making this determination in exemplary embodiments of the invention are described below.

DVD Content Protected by CPPM

For content protected by CPPM, correspondence exists between the Keying Material 114 and the Validation Data 402 if the Album Identifier in the non-VA region 404 (e.g., the Control Data Area 110 on a DVD) matches a copy of the Album Identifier in the BCA region 406. If the two values match, as determined by the comparator 502, then the device 500 validator 504 authenticates the Album Identifier, which can then be used to decrypt the medium content 112.

DVD Content Protected by CSS

For content protected by CSS, correspondence exists between the Keying Material 114 and the Validation Data 402 if a function of the Secure Disc Key Data in the non-VA region 404 (e.g., the Control Data Area 110 on a DVD) matches Validation Data 402 (i.e., a function of the Secure Disc Key Data) in the VA. A one-way cryptographic function, for example, of one of the Secure Disc Key Data values from the CDA 110 is written to the VA region 406, such that when a device 500 reads the Secure Disc Key Data value from the non-VA region 404, it uses the same one-way cryptographic function on that value.

The device 500 compares the calculated value as determined by the comparator 502, for example, and compares it to the Validation Data found in the VA region 406. If the values match, then the device 500 validator 504 authenticates the Secure Disc Key Data values, which can then be used to decrypt the medium content 112.

DVD Content Protected by CPPM/CSS

For content protected by a combination of CPPM/CSS, correspondence exists between the Keying Material 114 and the Validation Data 402 if a function of the Album Identifier in the non-VA region 404 (e.g., the Control Data Area 110 on a DVD) matches Validation Data 402 (i.e., function of the Secure Disc Key Data and function of the Album Identifier) in the VA. A one-way cryptographic function of one of the Album Identifier from CDA 110 Sector #2, and a one-way cryptographic function of the Secure Disc Key Data are written to the BCA region 406, such that when a device reads the Album Identifier and the Secure Disc Key Data from the CDA, it uses the same one-way cryptographic function on those values.

The device 500 calculates the function on the Album Identifier and on the Secure Disc Key Data from the non-BCA region 404 and compares the calculated values to the Validation Data found in the BCA region 406. If the values match, then the device 500 validator 504 authenticates the Album Identifier and Secure Disc Key Data, which can then be used to decrypt the medium content 112.

Conclusion

Thus, embodiments of the invention provide a robust means of validating Keying Material 114 to protect content, such as prerecorded CPPM or CSS content on DVD-ROM media, against unauthorized copying. The enhanced protection is enabled by new discs and new devices that use the invention. At the same time, full interoperability among new and old devices, and new and old media is maintained.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, while several exemplary embodiments have been described, it should be understood by one of ordinary skill in the art that concepts of this invention can be applied to other types of content, content protection systems, and media formats. For example, while the exemplary embodiments described herein are specific to DVD media as they relate to some of their current forms of protection (i.e. CPPM, CSS), one of ordinary skill in the art would understand that the read-only media described herein comprises a VA region and a non-VA region, and may not necessarily comprise all regions found in a DVD media.

Furthermore, while embodiments of the invention described herein refer to an area called the Validation Area, it should be understood that the Validation Area is an area having characteristics described herein, and that such an area is not limited to areas that are called, or that contain the term, Validation Area. As an example, DVD-ROMs comprise a Validation Area called a Burst Cutting Area.

While a one-way cryptographic function is discussed herein, it is also contemplated that a two-way cryptographic function may be used. For example, where no correspondence is checked, and Validation Data comprises a function of Keying Material, a two-way cryptographic function may be used which would convert the Validation Data back to its original Keying Material.

What is claimed is:

1. A method comprising:
   reading validation data from a validation area (VA) region of a medium having encrypted content;
   determining keying material used to decrypt the encrypted content W deriving the keying material from the validation data; and
   using the keying material to decrypt the encrypted content.

2. The method of claim 1, wherein the keying material is derived from the validation data by using the validation data itself where the validation data comprises the keying material.

3. The method of claim 1, wherein the keying material is derived from the validation data by using the validation itself where the validation data is a copy of the keying material that is written to the non-VA region of the medium.

4. The method of claim 3, wherein the medium uses CPPM (Content Protection For Prerecorded Media) format to protect the content, and:
   the keying material comprises an album identifier that is written to the non-VA region of the medium; and
   the validation data comprises a copy of the album identifier.

5. The method of claim 1, wherein the keying material is derived from the validation data by converting the validation data in the VA region into the keying material in the non-VA region.

6. The method of claim 5, wherein the converting the validation data into the keying material comprises using a function for converting the validation data into the keying material, the reverse function having been used to create the validation data from the keying material.

7. The method of claim 6, wherein the medium uses CSS (Content Scramble System) format to protect the content, and:
   the keying material comprises Secure Disc Key Data that is written to the non-VA region of the medium; and
   the validation data comprises a cryptographic function on the Secure Disc Key Data.

8. The method of claim 6, wherein decrypting the encrypted content comprises using the keying material to form a cryptographic key to decrypt the encrypted content.

9. The method of claim 6, wherein the medium comprises a DVD (Digital Versatile Disc), and the VA comprises a burst cutting area of the DVD.

10. A method comprising:
    determining if a medium having encrypted content is a Validated Medium by determining if validation data exists in a validation area (VA) region of the medium;
    if the medium is a Validated Medium, determining keying material used to decrypt the encrypted content by deriving the keying material from the validation data; and validating the keying material.

11. The method of claim 10, wherein said determining if the validation data exists in the VA region comprises determining if a trigger has been set.

12. The method of claim 11, wherein said determining if the trigger has been set comprises determining if the most significant bit of the keying material is set to 1.

13. The method of claim 10, wherein the keying material is derived from the validation data by using the validation data itself where the validation data comprises the keying material.

14. The method of claim 10, wherein the keying material is derived from the validation data by using the validation itself where the validation data is a copy of the keying material that is written to the non-VA region of the medium.

15. The method of claim 10, wherein the keying material is derived from the validation data by converting the validation data in the VA region into the keying material in the non-VA region.

16. The method of claim 10, wherein the medium comprises a DVD (Digital Versatile Disc), and the VA comprises a burst cutting area of the DVD.

17. A method comprising:
    determining if a medium having encrypted content is a Validated Medium by determining if validation data exists in a validation area (VA) region of the medium, the medium additionally having keying material written to a non-VA region of the medium;
    if the medium is a Validated Medium, determining if the validation data and the keying material correspond; and
    if the validation data and the keying material correspond, using the keying material in the non-VA region to decrypt the encrypted content.

18. The method of claim 17, wherein said determining if the medium is a Validated Medium comprises determining if a trigger has been set.

19. The method of claim 18, wherein said determining if the trigger has been set comprises determining if the most significant bit of the keying material is set to 1.

20. The method of claim 17, wherein the medium comprises a DVD-ROM (Digital Video Disc-Read Only Memory).

21. The method of claim 17, wherein said determining if the validation data and the keying material correspond comprises determining if the validation data and the keying material match.

22. The method of claim 21, wherein the medium uses CPPQ (Content Protection For Prerecorded Media) format to protect the content, and:
    the keying material comprises an album identifier that is written to the non-VA region of the medium; and the validation data comprises a copy of the album identifier.

23. The method of claim 17, wherein said determining if the validation data and the keying material correspond comprises determining if a cryptographic function on the keying material matches the validation data.

24. The method of claim 23, wherein the medium uses CSS (Content Scramble System) format to protect the content, and:
the keying material comprises Secure Disc Key Data that is written to the non-VA region of the medium; and
the validation data comprises a cryptographic function on the Secure Disc Key Data.

25. The method of claim 17, wherein the medium comprises a DVD (Digital Versatile Disc), and the VA comprises a burst cutting area of the DVD.

26. A method comprising:
determining if a medium having encrypted content is a Validated Medium by determining if validation data exists in a validation area (VA) region of the medium; and
if the medium is a Validated Medium, then performing one of the following;
determining keying material used to decrypt the encrypted content by deriving the keying material from the validation data, and then validating the keying material; and
determining if the validation data and the keying material correspond, and validating the keying material if the validation data corresponds to the keying material.

27. The method of claim 26, wherein the keying material is derived from the validation data by using the validation data itself where the validation data comprises the keying material.

28. The method of claim 26, wherein the keying material is derived from the validation data by using the validation itself where the validation data is a copy of the keying material that is written to the non-VA region of the medium.

29. The method of claim 26, wherein the keying material is derived from the validation data by converting the validation data in the VA region into the keying material in the non-VA region.

30. The method of claim 26, wherein the medium comprises a DVD-ROM (Digital Video Disc-Read Only Memory).

31. The method of claim 26, wherein the VA comprises a burst cutting area.

32. A machine-readable medium having stored thereon data representing sequences of instructions, the sequences of instructions which, when executed by a processor, cause the processor to perform the following:
determine if a medium having encrypted content is a Validated Medium by determining if validation data exists in a validation area (VA) region of the medium; and
if the medium is a Validated Medium, then perform one of the following:
determine keying material used to decrypt the encrypted content by deriving the keying material from the validation data, and then validate the keying material; and
determine if the validation data and the keying material correspond, and validate the keying material if the validation data corresponds to the keying material.

33. The machine-readable medium of claim 32, wherein the encrypted content is protected using CPPM (Content Protection for Prerecorded Media) format, and the keying material comprises an album identifier, and the validation data comprises a copy of the album identifier.

34. The machine-readable medium of claim 32, wherein the content is protected by CSS (Content Scrambling System), and:
the keying material comprises Secure Disc Key Data; and
the validation data comprises a function on the Secure Disc Key Data.

35. An apparatus comprising:
at least one processor; and
a machine-readable medium having instructions encoded thereon, which when executed by the processor, are capable of directing the processor to:
determine if a medium having encrypted content is a Validated Medium by determining if validation data exists in a validation area (VA) region of the medium; and
if the medium is a Validated Medium, then perform one of the following;
determine keying material used to decrypt the encrypted content by deriving the keying material from the validation data, and then validate the keying material; and
determine if the validation data and the keying material correspond, and validate the keying material if the validation data corresponds to the keying material.

36. The apparatus of claim 35, wherein the encrypted content is protected using CPPM (Content Protection for Prerecorded Media) format, and the keying material comprises an album identifier, and the validation data comprises a copy of the album identifier.

37. The apparatus of claim 35, wherein the content is protected by CSS (Content Scrambling System), and;
the keying material comprises Secure Disc Key Data; and
the validation data comprises a function on the Secure Disc Key Data.

38. An apparatus comprising;
means for determining if a medium having encrypted content is a Validated Medium by determining if validation data exists in a validation area (VA) region of the medium; and
the medium is a Validated Medium, then means for performing one of the following:
determining keying material used to decrypt the encrypted content by deriving the keying material from the validation data, and then validating the keying material; and
determining if the validation data and the keying material correspond, and validating the keying material if the validation data corresponds to the keying material.

39. The apparatus of claim 38, wherein the encrypted content is protected using CPPM (Content Protection for Prerecorded Media) format, and the keying material comprises an album identifier, and the validation data comprises a copy of the album identifier.

40. The apparatus of claim 38, wherein the content is protected by GSS (Content Scrambling System), and;
the keying material comprises Secure Disc Key Data; and
the validation data comprises a function on the Secure Disc Key Data.

41. An apparatus comprising:
encrypted content; and
keying material; and
validation data written to a validation area (VA) region of the medium, the validation data being used to validate the authenticity of the keying material.

42. The apparatus of claim 41, wherein the encrypted content uses Content Protection For Prerecorded Media (CPPM) format, and the validation data comprises an album identifier that is used to form a cryptographic key for decrypting the content.

43. The apparatus of claim 41, wherein the keying material is written to a non-VA region of the medium.

44. The apparatus of claim 41, wherein the apparatus comprises a DVD-ROM (Digital Video Disc-Read Only Memory).

45. The method of claim 41, wherein the VA comprises a burst cutting area.

46. An apparatus, comprising:
- a first module to determine if validation data exists in a validation area (VA) region of a medium, the medium having keying material for decrypting encrypted content on the medium, and the validation data being used to validate the authenticity of the keying material; and
- a second module to process the medium, if validation data exists in the VA region, by performing one of the following:
- using keying material derived from the VA region of the medium to decrypt the encrypted content; and
- finding correspondence between the validation data and the keying material, and if correspondence is found, using the keying material to decrypt the encrypted content.

47. The apparatus of claim 46, wherein the first module determines if validation data exists in a VA region of the medium by determining if a trigger is set.

48. The apparatus of claim 47, wherein the trigger is set if the most significant bit of the keying material is set to 1.

49. The apparatus of claim 46, wherein the validation data corresponds to the keying material if the keying material matches the validation data.

50. A system comprising:
- a medium having:
- encrypted content;
- keying material; and
- validation data written to a VA region of the medium
- a device coupled to the medium to play the encrypted content by performing one of the following:
- using the keying material derived from the VA region of the medium to decrypt the encrypted content; and
- determining if the validation data corresponds to the keying material and if the validation data corresponds to the keying material, then using the keying material to decrypt the encrypted content.

51. The system of claim 50, wherein the content is protected by CPPM (Content Protection For Prerecorded Media), and the keying material has an album identifier that is used to form a cryptographic key for decrypting the content.

52. The system of claim 50, wherein the content is protected by CSS (Content Scrambling System), and;
- the keying material comprises Secure Disc Key Data; and
- the validation data comprises a function on the Secure Disc Key Data.

53. A system comprising:
- a medium having:
- encrypted content; and
- keying material; and
- a device coupled to the medium to decrypt the encrypted content if the medium is a Validated Medium, and the authenticity of the keying material is validated.

54. The system of claim 53, wherein the authenticity of the keying material is validated by one of the following:
- using the keying material derived from the VA region of the medium; and determining that the validation data corresponds to the keying material.

55. The system of claim 54, wherein the validation data corresponds to the keying material if the keying material matches the validation data.

56. The system of claim 54, wherein the validation data corresponds to the keying material if a function of the keying material matches the validation data.

57. The system of claim 53, wherein the medium comprises a DVD-ROM (Digital Video Disc-Read Only Memory).

58. The method of claim 53, wherein the VA comprises a burst cutting area.

59. The system of claim 53, wherein said determining if the validation data exists in the VA region comprises determining if a trigger has been set.

60. The system of claim 59, wherein said determining if the trigger has been set comprises determining if the most significant bit of the keying material is set to 1.

* * * * *

UNITED STATES PATENT AND TRADEMARK OFFICE
CERTIFICATE OF CORRECTION

PATENT NO. : 6,957,343 B2
DATED : October 18, 2005
INVENTOR(S) : Ripley et al.

It is certified that error appears in the above-identified patent and that said Letters Patent is hereby corrected as shown below:

Column 13,
Line 35, delete "W" and insert -- by --.

Column 14,
Line 64, delete "CPPQ" and insert -- CPPM --.

Signed and Sealed this

Twenty-fourth Day of January, 2006

JON W. DUDAS
*Director of the United States Patent and Trademark Office*